United States Patent [19]

Kakuyama

[11] Patent Number: 5,148,328
[45] Date of Patent: Sep. 15, 1992

[54] PCM AUDIO SIGNAL RECORDING AND/OR REPRODUCING APPARATUS WITH RECORDING-MODE IDENTIFYING SIGNAL

[75] Inventor: Shinji Kakuyama, Tokyo, Japan

[73] Assignee: Sony Corporation, Tokyo, Japan

[21] Appl. No.: 543,037

[22] Filed: Jun. 22, 1990

Related U.S. Application Data

[63] Continuation of Ser. No. 315,175, Feb. 24, 1989, abandoned, which is a continuation of Ser. No. 873,495, Jun. 12, 1986, abandoned.

[30] Foreign Application Priority Data

Jun. 13, 1985 [JP] Japan ................... 60-128477

[51] Int. Cl.$^5$ .......................... G11B 5/02; G11B 5/00
[52] U.S. Cl. .................................. 360/27; 360/32
[58] Field of Search ........................ 360/32, 77

[56] References Cited

U.S. PATENT DOCUMENTS

| | | | |
|---|---|---|---|
| 4,313,140 | 1/1982 | Keidl | 360/18 |
| 4,333,113 | 6/1982 | Kalinowski | 360/27 |
| 4,402,021 | 8/1983 | Sonada et al. | 360/49 |
| 4,542,419 | 9/1985 | Morio et al. | 360/32 |
| 4,544,966 | 10/1985 | Taniguchi et al. | 360/18 |
| 4,551,771 | 11/1985 | Machida et al. | 360/19.1 |
| 4,563,714 | 1/1986 | Takeuchi | 360/77.14 |
| 4,651,239 | 3/1987 | Omori et al. | 360/77.14 |
| 4,680,648 | 8/1987 | Takayama | 360/77.14 |

FOREIGN PATENT DOCUMENTS

| | | |
|---|---|---|
| 0085578 | 8/1983 | European Pat. Off. ........... 360/19.1 |
| 0102600 | 3/1984 | European Pat. Off. . |
| 0173538 | 3/1986 | European Pat. Off. . |
| 0196104 | 10/1986 | European Pat. Off. . |
| 57-081740 | 5/1982 | Japan . |
| 59-168959 | 9/1984 | Japan . |
| 2087195 | 5/1982 | United Kingdom . |
| 2107557 | 4/1983 | United Kingdom . |
| 2170641 | 8/1986 | United Kingdom . |
| 2207279 | 1/1989 | United Kingdom . |

OTHER PUBLICATIONS

1985 IEEE International Conference on Consumer Electronics, Jun. 5–7, 1985, pp. 50–51.

*Primary Examiner*—Vincent P. Canney
*Attorney, Agent, or Firm*—Hill, Van Santen, Steadman & Simpson

[57] ABSTRACT

A PCM (pulse code modulated) audio signal recording and/or reproducing apparatus, operates with plural scanning periods, in which a rotary head scans obliquely the longitudinal direction of a tape, and which scanning periods are separated into a plurality of segment periods. PCM audio signals are recorded on one or more channels of a plurality of track channels, formed by the alignment of respective segment tracks which are scanned by the rotary head during the corresponding segment periods of each scanning period, and an identifying signal, indicative of the fact that the PCM audio signals is already recorded, is superimposed upon the PCM audio signal and recorded together therewith on the track channels, whereby it becomes possible to easily identify whether or not the PCM audio signal is recorded on the of track channels.

1 Claim, 6 Drawing Sheets

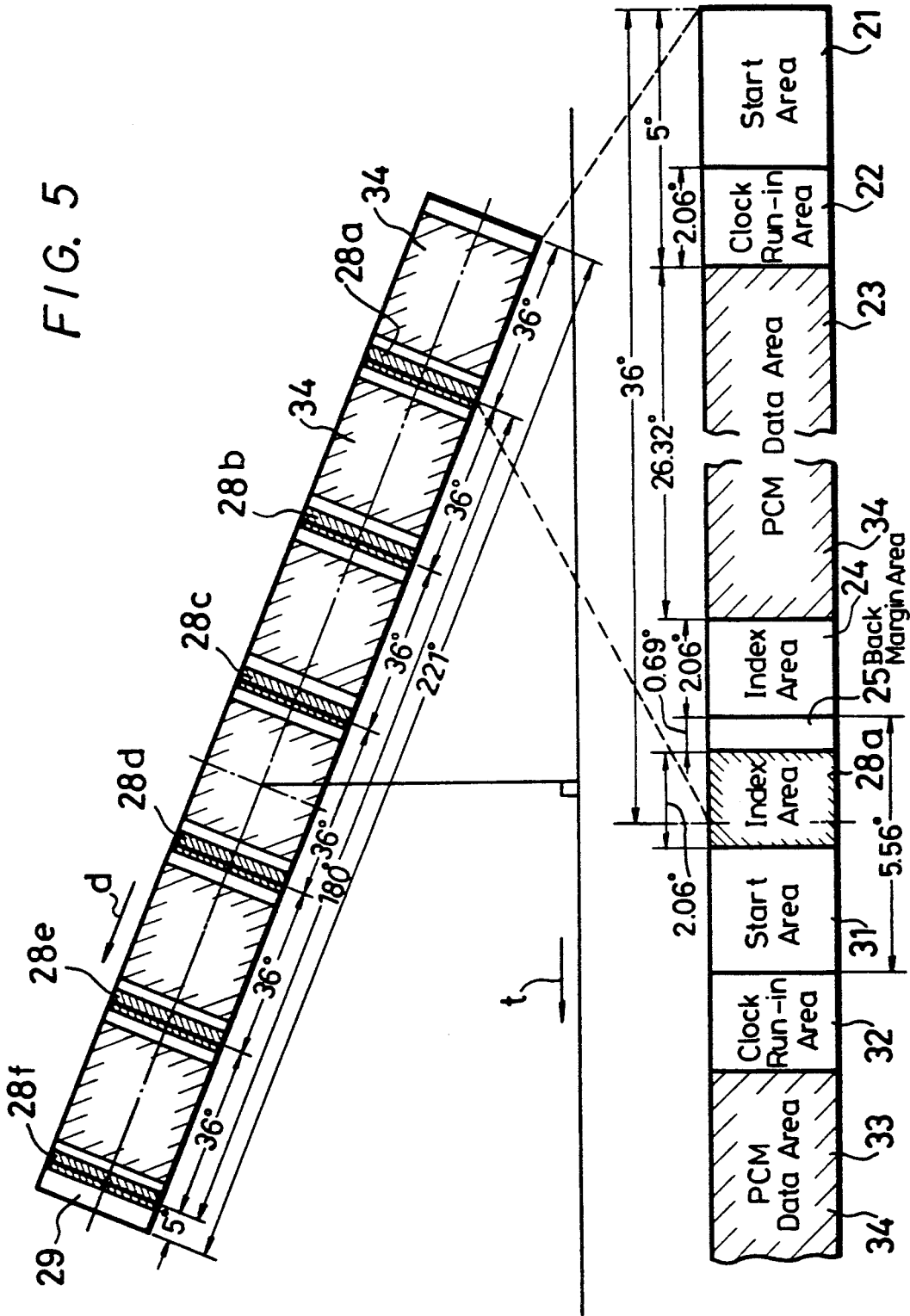

PCM AUDIO SIGNAL RECORDING AND/OR REPRODUCING APPARATUS WITH RECORDING-MODE IDENTIFYING SIGNAL

This is a continuation of application Ser. No. 315,175, filed Feb. 24, 1989, now abandoned, which is a continuation of application Ser. No. 873,495 filed Jun. 12, 1986, now abandoned.

BACKGROUND OF THE INVENTION

1. Field of the Invention

The present invention relates to a PCM (pulse code modulated) audio signal recording and/or reproducing apparatus for recording and/or reproducing a PCM audio signal by using a rotary head.

2. Description of the Prior Art

A standaridzation for the so-called 8 mm video tape recorder has been set internationally. With such standardization, as shown in FIG. 1, recording and/or reproducing are carried out by a pair of first and second channel rotary magnetic heads H1 and H2 mounted to a rotary drum RD with an angular spacing of 180° therebetween, and a magnetic tape TP is wrapped around 221° of the peripheral surface of a tape guide drum and then guided. In a 180° interval of the 221°, a video signal is recorded and/or reproduced, while a PCM audio signal with a compressed time base is recorded and/or reproduced in the interval of the remaining 36°. Such prior art 8 mm video tape recorder is disclosed, for example, in Machida et al, U.S. Pat. No. 4,551,771.

The azimuths of the head gaps of the first and second channel rotary magnetic heads H1 and H2 are made different from each other by +10°. In the vicinity of the second channel rotary magnetic head H2, there is provided an auxiliary rotary magnetic head H3 for a variable speed playback mode which is spaced apart from the second channel rotary magnetic head H2 with a distance corresponding to two horizontal periods on the tape TP. The azimuth of the gap of this auxiliary rotary magnetic head H3 is selected to be the same as that of the gap of the first channel rotary magnetic head H1.

There is further provided an erase rotary magnetic head He with an angle of 90° relative to the first and second channel rotary magnetic heads H1 and H2. The gap width of the erase rotary magnetic head He corresponds to the width of two skewed tracks In FIG. 1, reference letter d designates the rotation direction of the rotary magnetic heads H1, H2, H3 and He. In this case, the auxiliary rotary magnetic head H3 precedes the second channel rotary magnetic head H2. Reference letters $g_1$, $g_2$, $g_3$ and $g_e$ designate head gaps of the first and second channel rotary magnetic heads H1, H2, the auxiliary rotary magnetic head H3 and the erase rotary magnetic head He, respectively.

Referring to FIG. 1, guide pins G1 and G2 are shown to define a tape wrapping angle at which the tape TP is wrapped around the tape guide drum formed of the rotary drum RD and a fixed drum (not shown). The tape TP is transported in a direction t and this direction t is the same as the rotation direction d of the rotary drum RD. The U.S. patent application of Okada et al, Ser. No. 838,626 for such video tape recorder comforming to such standardization as described above was already filed by the assignee of this application on Mar. 11, 1986.

FIG. 2 shows a format of a recording track formed on a tape according to the above mentioned standardization. From the right-hand side at which the rotary head begins to contact with the tape, at the tip end of the track there is provided a tracing start area 21 of 5° of a rotation angle of the rotary head. At the rear portion of the tracing start area 21, over 2.06° (corresponding to 3 horizontal intervals (H) of a video signal), there is provided a clock run-in area 22 which is synchronized with succeeding PCM data. Next to the clock run-in area 22, there is provided a PCM data area 23 over 26.32° for use with an audio signal with a compressed time base. A period or area of 2.06° (3H) next to the PCM data area 23 is assigned as a back margin area 24 for coping with the erroneous displacement of the recording position upon the so-called after-recording mode. Next to the back margin area 24, there is provided a guard area 25 of 2.62° between a video area and PCM data area. This guard area 25 is followed by a video signal area 26 of one field period over 180° and next to this video signal area 26, there is further provided a detaching area 27 of 5°.

Accordingly, with this standardization, the video signal of one field period is recorded on and/or reproduced from the video signal area 26, while the audio signal of 1/60 second period corresponding thereto is pulse-code-modulated, corrected for error and the like, time-base, compressed to about 1/6.8 and then recorded on and/or reproduced from the PCM data area 23. This recording track is slantly and sequentially formed in the longitudinal direction of the tape TP, whereby the successive video signal and audio signal can be recorded and/or reproduced.

In the afore-mentioned standardization, if the 180° of the video signal area 26 is divided equally by 5, each divided segment is given 36°. While, if the 26.32° of the PCM data area 23, the 5° of the tracing start area 21, the 2.06° of the back margin area 24 and 2.62° of the guard area 25 are added, they just form a length of 36°. For this reason, it is proposed to contruct an apparatus for the exclusive use for recording and/or reproducing an audio signal by utilizing the apparatus conforming to the standardization as described above. Such special apparatus is disclosed in Morio et al, U.S. Pat. No. 4,542,419.

FIG. 3 shows one example of a format of recording track by such apparatus.

Referring to FIG. 3, the area extending from the tracing start area 21, in which the rotary magnetic head begins to contact with the tape, to the guard area 25 is formed equivalently to that of the above mentioned standardization and this area is assigned as a first segment. From the start of the former video signal portion 26, there are sequentially provided a tracing start area 31, a clock run-in area 32, a data area 33, a back margin area 34 and a guard area 35 and this interval is assigned as a second segment. Further, a similar arrangement to the second segment is repeatedly provided at every 36° of the video signal area 26 and they are assigned as third to sixth segments. Next to the sixth segment, there is provided a detaching area 27 of 5°.

As a result, there are provided separate six segments. ,Then, with respect to each of these respective segments, the rotation angular position of the rotary head is controlled for recording and playback. During a time period corresponding to a desired segment (period) of 36°, the PCM data is generated and the recording of such data on the tape is carried out. During that time period the reproduced signal is read from the tape so that playback or reproducing is carried out. Thus, it is possible to independently record the PCM audio signal on and/or reproduce it from six separate track channels made of the alignment of segment tracks which are alternately scanned by the rotary heads H1 and H2. When the re-recording is carried out on a tape that was used once, the erase rotary head (so-called flying-erase head) He is used to erase previously recorded data, and during only a time period in which the rotary erase head He contacts with a desired segment, the erase head He is driven to selectively erase the segment of that period so that a re-recording of that segment only can be accomplished.

As described above, the PCM audio signal can be independently recorded on and/or reproduced from each track channel which is divided by 6 in the widthwise direction of the magnetic tape. For example, it becomes possible, by using a tape capable of, for example, 2-hour recording, to record the PCM audio signal for 12 hours which recording time is 6 times the recording time.

While the first channel rotary head H1 scans a first segment of a certain recording track, the second channel rotary head H2 scans a 6th segment of the following recording track, etc.

OBJECTS AND SUMMARY OF THE INVENTION

Accordingly, it is an object of this invention to provide an improved PCM audio signal recording and/or reproducing apparatus.

It is another object of this invention to provide a PCM audio signal recording and/or reproducing apparatus in which it becomes possible to easily identify whether or not the PCM audio signal is already recorded on a plurality of track channels.

It is a further object of this invention to provide a PCM audio signal recording and/or reproducing apparatus in which, when a PCM audio signal is recorded by a pair of rotary heads having gaps with different azimuths, it becomes possible to positively identify whether or not the PCM audio signal is recorded on the plurality of track channels with good electrical response.

According to one aspect of the present invention, there is provided a PCM audio signal recording and/or reproducing apparatus in which a rotary head scans obliquely the longitudinal direction of a tape with each scanning period being separated into a plurality of segment periods, and a PCM audio signal is recorded on one channel of a plurality of track channels formed by the alignment of respective segment tracks, such segment tracks being scanned by said rotary head during the same segment period of each of said scanning periods. The apparatus is characterized in that the PCM audio signal and an identifying signal, indicative of the fact that the PCM audio signal is already recorded, are recorded together on said track channel and are superimposed upon each other.

According to another aspect of the present invention, there is proved a PCM audio signal recording and/or reproducing apparatus in which a pair of rotary heads having gaps with different azimuths scan obliquely the longitudinal direction of a tape with each scanning period being separated into a plurality of segment periods, and a PCM audio signal is recorded on one channel of the plurality of track channels formed by the alignment of respective segments which are scanned by said pair of rotary heads during the same segment period in each of said scanning periods. The apparatus is characterized in that said PCM audio signal, and an identifying signal indicative of the fact that the PCM audio signal is already recorded, are recorded together on said track channel are superimposed upon each other, with the identifying signal being reproduced by a pair of rotary heads located closely along the scanning direction and having different gap azimuths, and a logical sum of the reproduced outputs is used to identify whether of not said PCM audio signal is recorded on said track channel.

According to a further aspect of the present invention, there is provided an apparatus for recording a plurality of PCM audio signals on a record medium, said apparatus comprising:

a) audio signal processing means for converting said PCM audio signals into discrete time-compressed digital signals;

b) transducer means responsive to said digital signals;

c) transport means for establishing a relative scan of said transducer means with respect to said record medium in a multiplicity of successive parallel tracks;

d) switch means selectively connecting said audio signal processing means to said transducer means;

e) control means for controlling said switch means to supply said digitial signals to said transducer means;

f) pilot signal generating means for generating a single frequency signal, which frequency is selected substantially lower than that of said time-compressed digital audio signal; and g) mixing means for superimposing said time-compressed digital audio signal on said pilot signal whereby, during multi-PCM recording, it can be determined at the time of playback, whether normal recording mode (for picture and voice recording) or multi-PCM recording has been used.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 5 is a diagrammatical representation showing a track format of an embodiment of the present invention;

DESCRIPTION OF THE PREFERRED EMBODIMENT

An embodiment of a PCM audio signal recording and/or reproducing apparatus according to the present invention will hereinafter be described with reference to the attached drawings.

Figure 1:
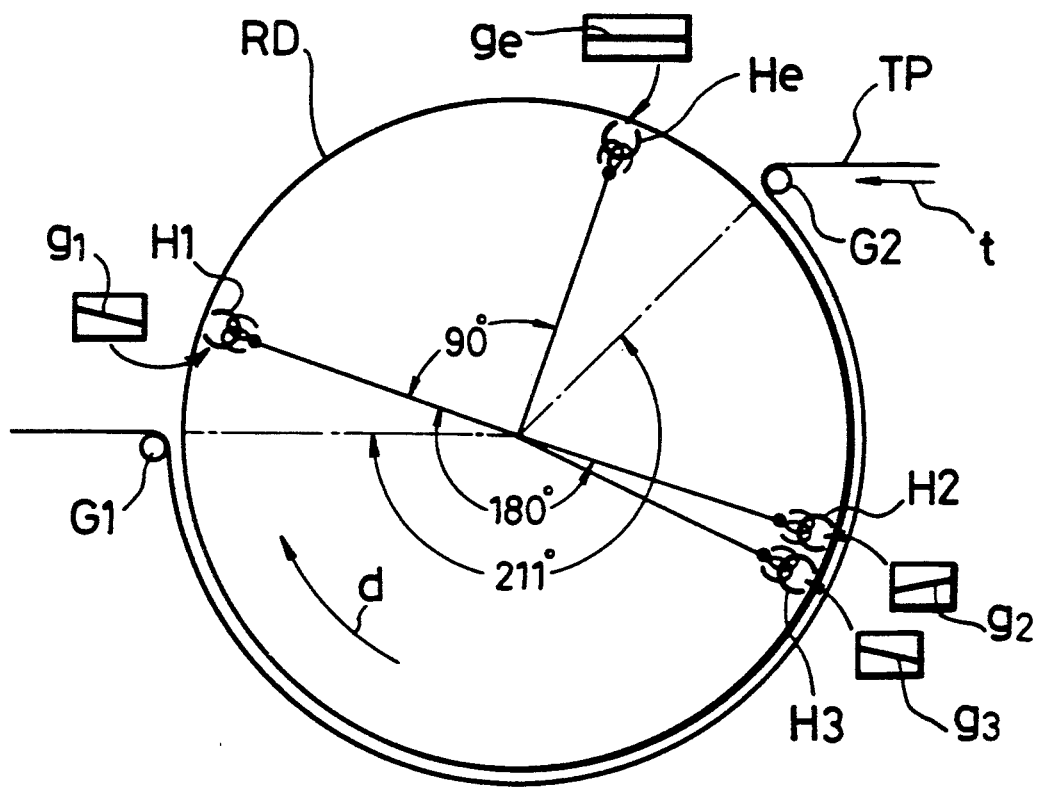
FIG. 1 is a schematic diagram showing an example of a tape guide drum of a prior, art video tape recorder.
Figure 4:
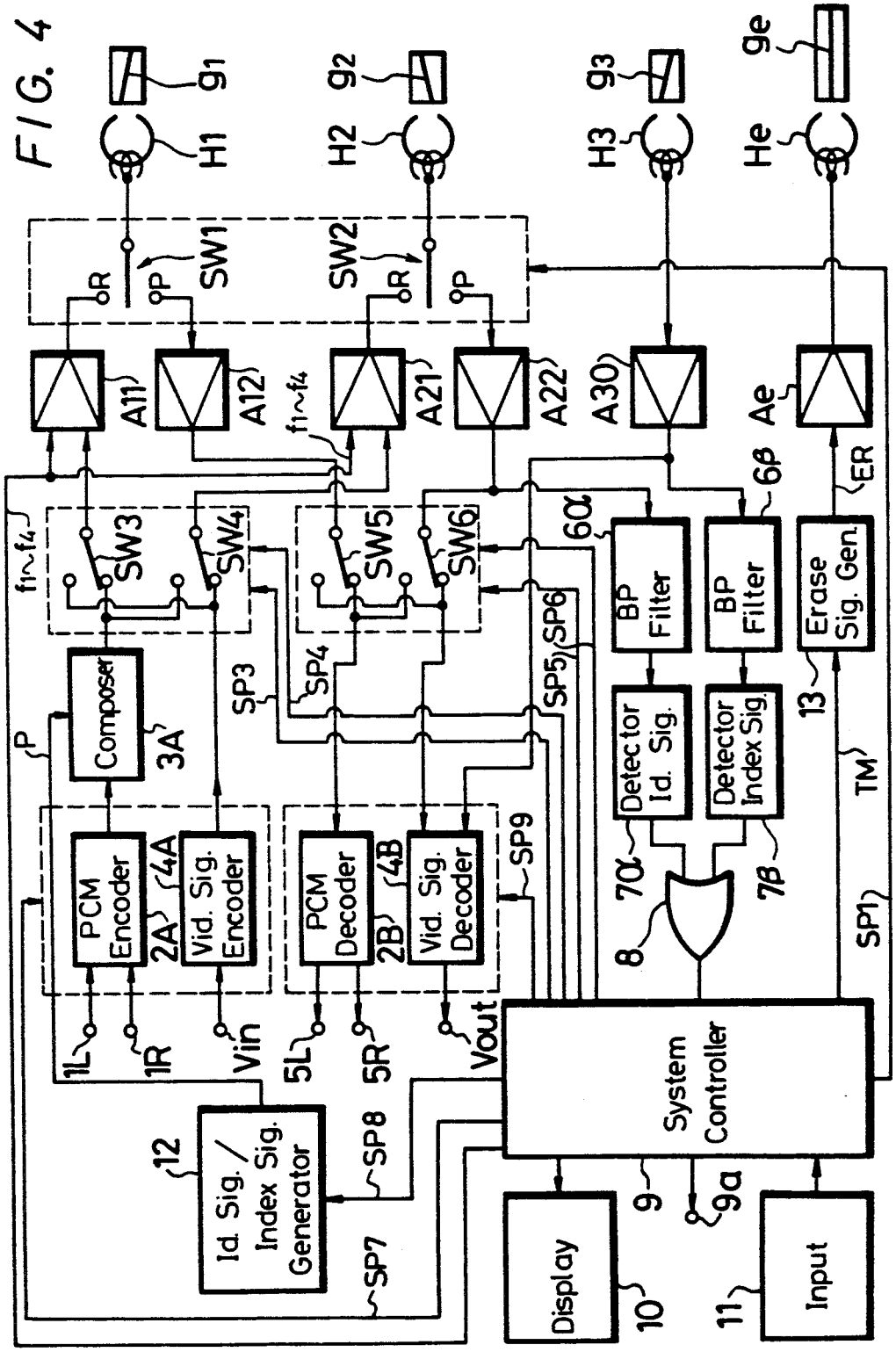
FIG. 4 is a block diagram showing an example of a video tape recorder embodying the present invention.

FIG. 4 schematically illustrates an example of a video tape recorder to which the present invention is applied. In FIG. 4, like references H1, H2 and H3 and He designate, respectively, the first and second channel rotary magnetic heads, the auxiliary rotary magnetic head and the erase rotary magnetic head which are already described in connection with FIG. 1.

Referring to FIG. 4, the first and second rotary magnetic heads H1 and H2 are switchably connected through record/playback change-over switches SW1 and SW2 to output sides of recording amplifiers A11 and A21 and to input sides to playback amplifiers A12 and A22, respectively. Reference SP1 designates a recoding/reproducing switching pulse which is supplied to the switched SW1 and SW2 from a system controller 9 which will be described later.

The auxiliary rotary magnetic head H3 is connected to the input side of a playback amplifier A30, while the erase rotary magnetic head He is connected to the output side of an erase amplifier Ae.

A PCM encoder 2A is shown to receive left and right audio signals from its input terminals 1L and 1R and to PCM-encode them. Also in the PCM encoder 2A, the PCM left and right audio signals are gated with a scanning timing of each segment track of the track channel, by a timing control signal SP7 from the system controller 9, and then supplied to a composer 3A. This composer 3A is used to frequency-multiplex two input signals.

An identifying signal/index signal generator 12 generates an identifying signal and an index signal. The index signal and the identifying signal may both have a frequency of, for example, 228.748 KHz (in the case of the NTSC system), which does not interfere with four frequency tracking pilot signals and does not affect the error rate of the PCM audio signal The index signal is indicative of the head position of the recording area. The identifying signal and the index signal will be inserted as required and described in detail later with reference to FIG. 5. The timing at which the generator 12 produces the identifying signal and the index signal is controlled by a control signal SP8 derived from the system controller 9. The identifying signal and the index signal from the generator are supplied to the composer 3A in which they are mixed with the PCM audio signal derived from the PCM encoder 2A. The composer 3A is formed of a noise reduction circuit, an A/D (analog-to-digital) converter, an error correction code adding circuit, a bit-reduction circuit, an FM-modulation circuit, and the like The identifying signal may be different from the index signal in frequency but it is placed in such a frequency relation as to be interleaved with tracking pilot signals. For instance, with the horizontal scanning frequency $f_H$ of 15.734 KHz, a frequency of $378 f_H/N = 5.947452$ MHz/N is produced by the system controller 9, and tracking pilot signals $f_1$ to $f_4$ and an identifying pilot signal $f_p$ of this invention will be determined as follows.

| | |
|---|---|
| $f_1$: N = 58 | 102.542 KHz |
| $f_2$: N = 50 | 118.949 KHz |
| $f_3$: N = 36 | 165.207 KHz |
| $f_4$: N = 40 | 148.586 KHz |
| $f_p$: N = 26 | 228.748 KHz |

The PCM audio signal, the identifying signal and the index signal from the composer 3A are supplied to change-over switches SW3 and SW4, which are changed-over by switching control signals SP3 and SP4 derived from the system controller 9. By means of the switches SW3 and SW4, the output of the composer 3A, and the output from a video signal encoder 4A, having a video input terminal Vin, are switchably supplied to the recording amplifiers A11 and A21, respectively. The video signal encoder or processor 4A forms an FM luminance signal and a chroma signal located at the lower frequency band of the FM luminance signal. The tracking pilot signals $f_1$ to $f_4$ are respectively added to the PCM audio signal, at the amplifiers A11 and A21, respectively.

The reproduced outputs from the playback amplifiers A12 and A22 are switchably selected by change-over switches SW5 and SW6, which are changed-over by switching control signals SP5 and SP6 derived from the system controller 9, and then fed to a PCM decoder 2B. Then from respective output terminals 5L and 5R of the PCM decoder 2B, there are derived left and right audio signals which are PCM-decoded. A video decoder circuit 4B is provided when the PCM audio signal recording and/or reproducing apparatus of this invention is used as a video signal recording and/or reproducing apparatus, and Vout designates a video output terminal thereof. The audio decoder 2b is adapted to decode the audio signal in response to the control signal SP9 furnished from the system controller 9.

The reproduced signals reproduced by the second channel rotary head H2 and the auxiliary rotary head H3 and derived from the playback amplifiers A22 and A30, are respectively supplied through band pass filters $6\alpha$ and $6\beta$, each having a pass band center frequency of 228.748 KHz, to detectors $7\alpha$ and $7\beta$ each of which uses a PLL (phase locked loop). The detectors $7\alpha$ and $7\beta$ are used to detect the presence or absence of the identifying signal and the index signal. In this case, there is such a case where the recording azimuths are different depending on the segment tracks (6 segments in this embodiment) within each track, the identifying signal and the index signal are mainly reproduced from the rotary heads H2 and H3 which have a smaller azimuth loss, due to the recording magnetic pattern and the gap of the reproducing head. Therefore, the outputs (outputs of "1" or "0") from the detectors $7\alpha$ and $7\beta$ are supplied through a logical sum circuit (OR circuit) 8 to the system controller 9, and the identifying signal and the index signal are detected by the system controller 9. The system controller 9 is also supplied with rotation detecting signals from a drum motor and a capstan motor (not shown). Upon playback with a variable tape speed, the output from the auxiliary rotary head H3 is supplied to the video reproducing processor 4B in which it is processed together with the output from the second channel rotary head H2. Selection of the input signal source for the video decoder 4B is controlled by the signal SP9 from the controller 9.

Whether or not the PCM audio signal is recorded on each track channel is identified by the system controller 9, and the identified result is displayed on a display apparatus 10. When the identifying signal is detected by the system controller 9, the video circuit system is interrupted by the control signal developed at an output terminal 9a of the system controller 9, and also the capstand servo and the drum servo are changed-over to those for the respective track channels. Through the display of the display apparatus 10, a vacant or unrecorded channel of the track channels is confirmed. A track channel on which the PCM audio signal should be recorded is specified by an input apparatus 11, or the PCM audio signal of the track channel that was already recorded can be erased, as selected by the input apparatus 11.

The identifying signal and the index signal are recorded on the tape TP only during the multi-segment PCM mode. The index signal is additionally inserted when the user desires it, for marking a location on the tape, to facilitate subsequent review and/or editing.

An erase signal generator (oscillator) 13 is adapted to be controlled in its timing, to generate an erase signal ER, by a timing control signal TM derived from the system controller 9. The erase signal ER from this erase signal generator 13 is supplied to the erase amplifier Ae.

Figure 3:
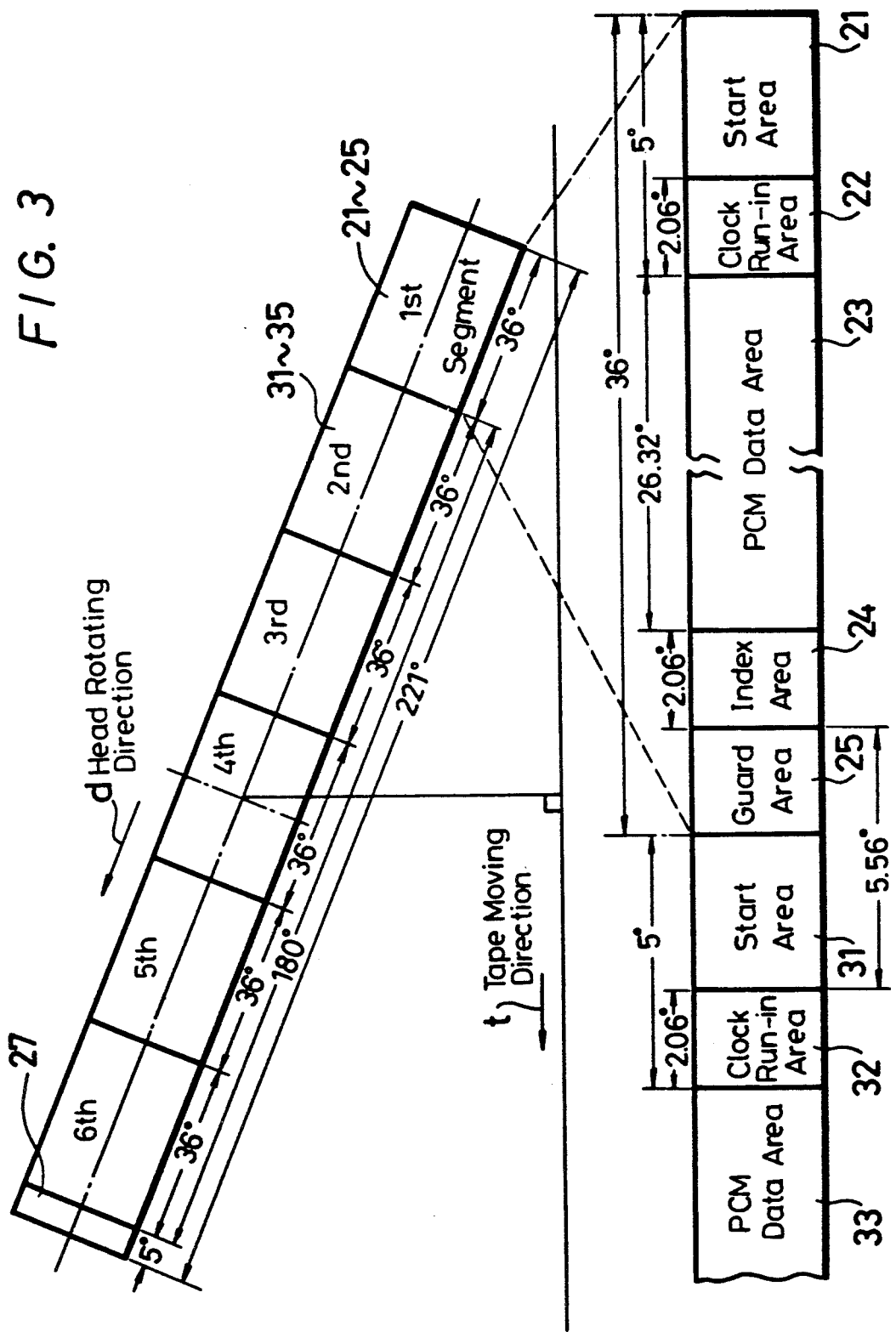

The track format used in this embodiment will be described with reference to FIG. 5. In this track format, an identifying signal 34 is superimposed upon the PCM audio signal and then recorded together on the PCM data sections 23, 33, ..., of the 1st to 6th segments in the track format shown in FIG. 3. Further, an index area is provided at the position over the back margin section or area 24 following the PCM data area, the guard area 25 of each segment and the next tracing start area 21, 31 of the next segment. In the index areas, there are recorded independent 1st to 6th index signals 28a to 28f, respectively. As shown in FIG. 5, each index signal is spaced between two PCM areas 34 by a back margin and guard area on one side, and by a start and clock run in area on the other side.

Figure 6A:
FIGS. 6A to 6C are timing charts respectively showing the timing relationship of several indicating signals.
Figure 6B:
Figure 6C:
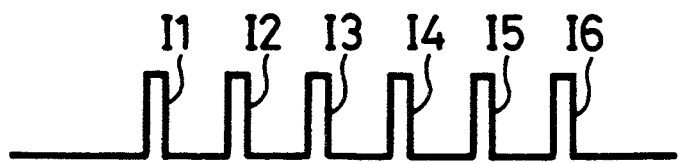
Figure 2:
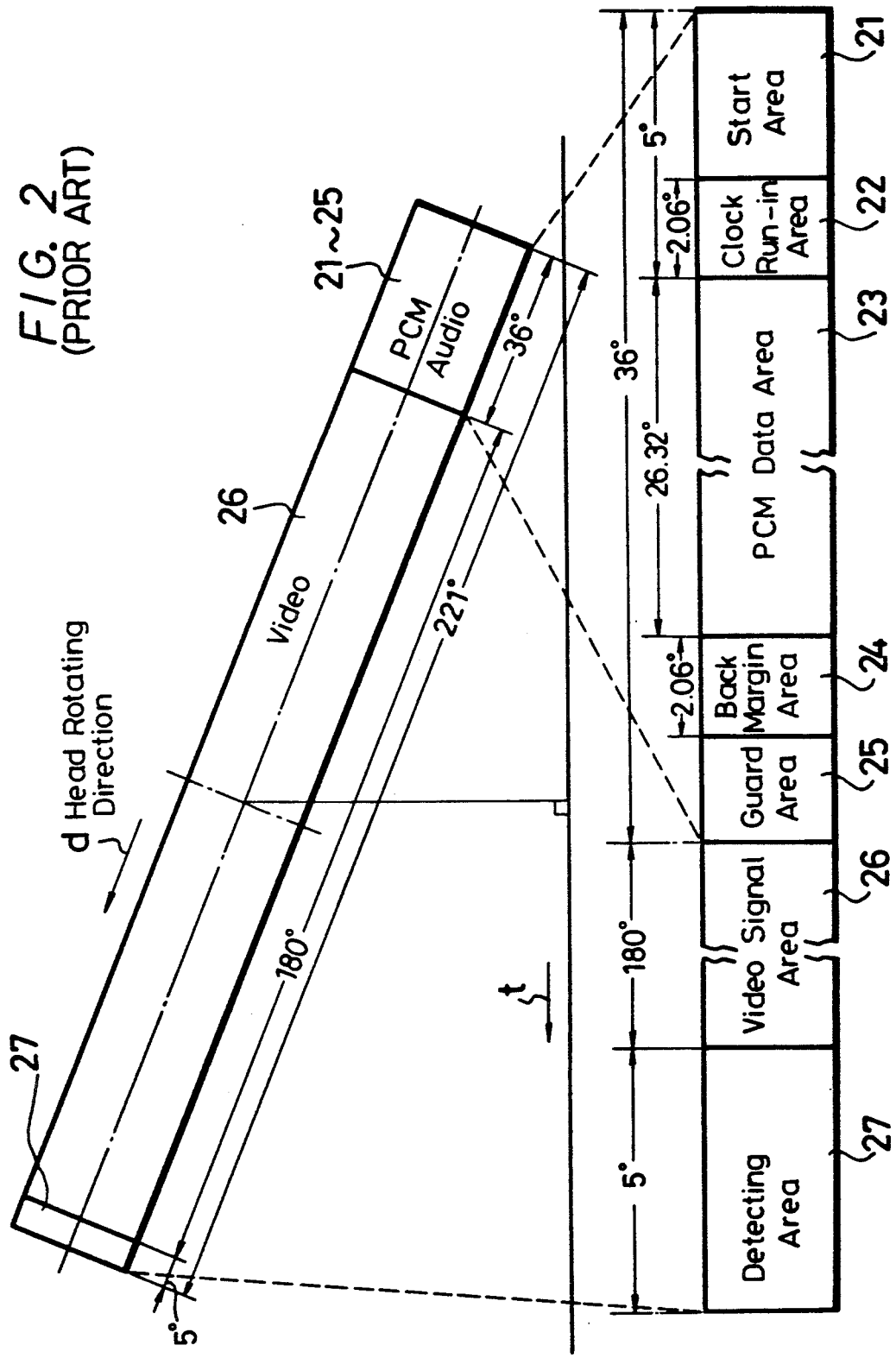
FIGS. 2 and 3 are diagrammatically representations respectively showing a track format of an 8 mm vido tape recorder and track format of a multi-segment PCM mode.

FIGS. 6A to 6C respectively illustrate timing relationships of the reproduced identifying signal and index signal relative to the switching control signals SP5 and SP6, which control the change-over switches SW5 and SW6, in order to supply output signals from heads H1 and H2 to the PCM decoder 2B (or to the video decoder 2B). FIG. 6A shows the signal SP5 which is formed on the basis of the head rotation position signal by the system controller 9; FIG. 6B shows identifying signals M1 to M6, each having a frequency of 228.748 KHz, for the PCM data area of the respective segments; and FIG. 6C shows index signals I1 to I6 corresponding to the respective segments, and illustrate that the index signals are spaced between PCM areas where the identifying signal is recorded.

When the motor which drives the rotary drum RD is servo-controlled, on the basis of the rising or falling edge of the head switching pulse SP5, it is possible to discriminate the respective identifying signals M1 to M6 and the respective index signals I1 to I6 by counting the pulses occuring after a leading or trailing edge of the SP5 signal by means of the system controller 9. During operation of the high speed search mode, in order to correct the reproduced frequency, it is necessary to adjust the rotation of the rotary drum RD, in response to the speed of revolution of the capstan. During this time, since the period of the head switching pulse SP5 is varied, the timings at which the identifying signals and the index signals are detected are corrected by use of a microcomputer (not shown) provided in the system controller 9.

The index signal is used as the position detecting signal, for control of recording, reproducing and erasing the PCM audio signal of the segment track in each track channel.

Figure 7A:
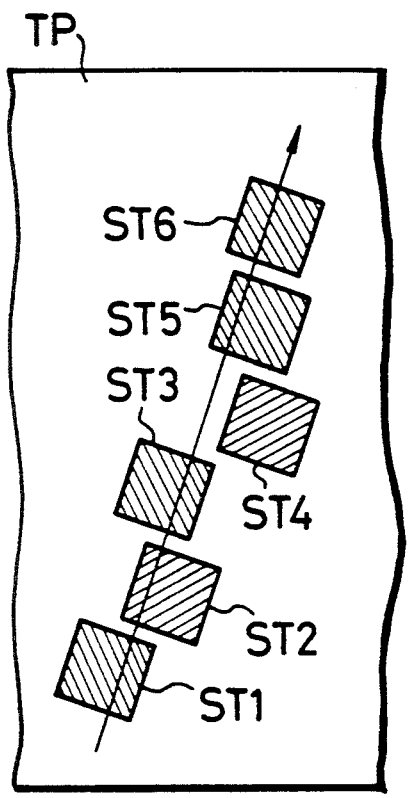
FIG. 7A is a schematic representation showing the segment track pattern of the invention.

FIG. 7A illustrates 1st to 6th segment tracks ST1 to ST6. Since these segment tracks ST1 to ST6 are recorded at every channel track, unlike the recording mode in which the PCM audio signal is recorded together with the video signal, these segment tracks ST1 to ST6 are not regularly aligned in a single scanning direction of the rotary heads H1 and H2, relative to the tape TP. Further, the recording gap azimuths of the segment tracks near the one scanning direction do not always become the same. In FIG. 7, there is shown the state that the recording azimuths (slant lines) of the respective segments are recorded in different directions. Furthermore, in the cue, review and variable speed playback mode (including the reverse playback mode), the recording azimuths of the segment tracks are not determined uniquely.

Figure 7B:
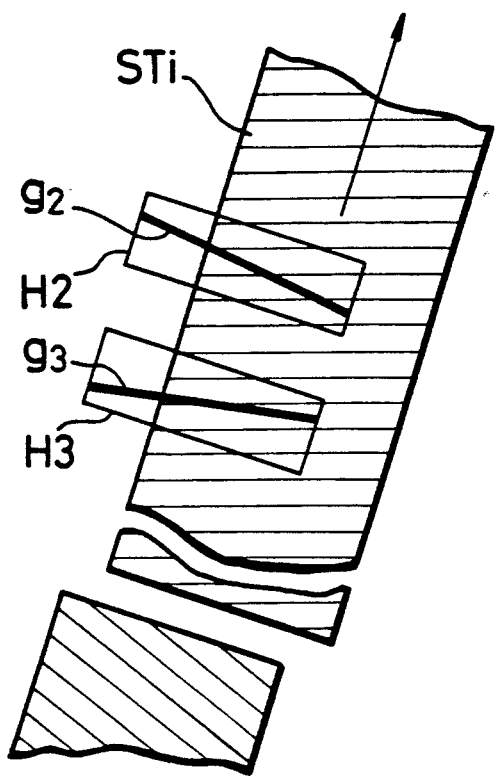
FIG. 7B is a schematic representation showing the locations of the rotary heads and the segment tracks.

FIG. 7B is a representation which illustrates the relationship between the recording azimuth of the arbitrary segment track STi and the azimuths of the head gaps of the rotary heads H2 and H3. As seen in FIG. 7B, the azimuth of the gap $g_2$ of the rotary head H2 and the recording azimuth of the segment track STi do not coincide with each other, while the azimuth of the gap $g_3$ of the rotary head H3 and the recording azimuth of the segment track STi coincide with each other. Accordingly, in this case, the identifying signal and the index signal are obtained from the rotary head H3.

Because the frequency of the identifying signal is selected to be suitably frequency-interleaved, so that it is not affected by the luminance signal of the video signal, and the side band of the chroma signal, then it is possible to discriminate the video and PCM audio modes from the multi PCM audio mode.

Figure 8:
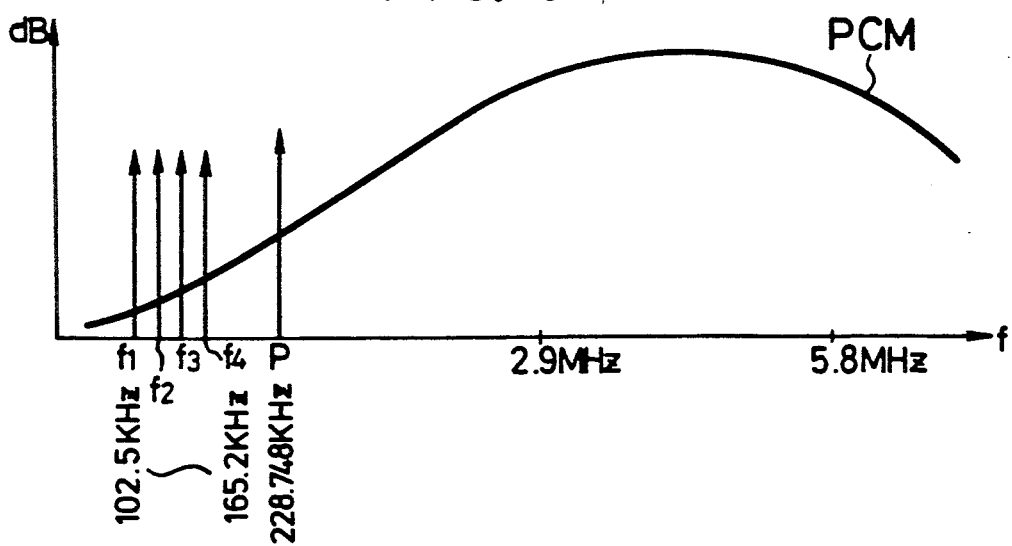
FIG. 8 is a spectrum diagram showing the frequency distribution of a PCM audio signal, a tracking pilot signal and an identifying signal used in the present invention.

FIG. 8 is a diagram of a frequency spectrum distribution showing a spectrum "PCM" of the PCM audio signal, the auto tracking pilot signals $f_1$ to $f_4$ and the identifying pilot signal P of the present invention.

According to the present invention, as set forth above, each scanning period in which the rotary head scans obliquely the longitudinal direction of the tape is separated into a plurality of segment periods, and the PCM audio signal is recorded on an arbitrary track channel of the plurality of track channels formed as the respective segment tracks are scanned by the rotary head during the same segment period. It is possible to obtain a PCM audio signal recording and/or reproducing apparatus which can easily identify whether or not the PCM audio signal is recorded on the plurality of track channels.

According to another aspect of the present invention, when the PCM audio signal is recorded by the pair of rotary heads having different azimuths of gaps in the above recording system, then it is possible to use a PCM audio signal recording and/or reproducing apparatus in order to positively identify whether or not the PCM audio signal is recorded on the plurality of track channels, with good electrical response.

The system controller 9 of FIG. 4 is preferably constructed in the same manner as system controllers which are conventionally used in commercially available 8 mm video tape recorder apparatus, and therefore need not be described in detail. It will be understood by those skilled in the art that the controller produces pulses with the correct time as needed for operation of the switches SW1-SW6 in synchronism with rotation of the drum RD. In the PCM recording mode, the signal SP7 enables the PCM encoder 2A at times synchronized with recording PCM data on a selected one of the six track channels during each segment period, and the output of the encoder is supplied to the appropriate recording head over switches SW3 and SW4, controlled by SP3 and SP4. SP8 enables the generator 12 to produce the index and identification signals at the proper times. Alternatively, the erase signal generator 13 is enabled at times synchronized with the erasing of a selected track channel. The correct timing for a selected track channel is determined in relation to the switching signals SP3 and SP4, which are already available for controlling selection of one of the heads H1 and H2. In the PCM playback mode, identified by a signal produced by the OR gate 8, the timing for a selected track channel is established by apparatus within the system controller (or an equivalent software program) for counting the pulses produced at the output of the OR gate 8, and timing the signals SP5 and SP6 so that signals from the selected track channel are supplied to the PCM decoder 2B. Selection of the record/playback function is done conventionally, using the input apparatus 11, and selection of a given track channel is done the same way.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

What is claimed is:

1. A PCM audio signal recording and/or reproducing apparatus comprising, in combination;
    a pair of rotary heads having the recording azimuth of gaps different from each other for scanning obliquely the longitudinal direction of a tape in successive scanning periods, with each scanning period being separated into a plurality of successive signal periods,
    means for recording a PCM audio signal on any one or more track channels of a plurality of track channels,
    each said one track channel corresponding to the alignment of respective segment tracks with said rotary head during corresponding segment periods of each of said scanning periods,
    means for recording a set of auto-tracking pilot signals in the substantially lower band area of said PCM audio signal,
    said identifying signal and said PCM audio signal being superimposed upon each other in such a relation that said identifying signal is allocated between the band of said auto-tracking pilot signal and the peak band of said PCM audio signal,
    said means for recording being operative to record said PCM audio signal and said identifying signal in spaced-apart segment tracks on said tape, whereby the several segment periods of each scanning period are individually identifiable as said rotary heads scan said tape,
    means for selectively recording an index signal between adjacent segment tracks, for selectively identifying a PCM audio signal location at a given segment period only when the user of said apparatus so desires for facilitating segment review, or editing,
    an additional rotary head having a similar azimuth gap as one of said recording heads, and
    detecting means connected to one of said rotary heads and said additional rotary head for developing a signal in response to detection of said identifying signal within said segment period, said detecting means having a band pass filter with a pass band including the frequency of said identifying signal and a detector connected to said filter for producing a signal in response to the output of said filter.

* * * * *